Aug. 6, 1935. L. G. COPEMAN 2,010,060
METHOD OF AND APPARATUS FOR COOLING BEER
Filed May 15, 1933
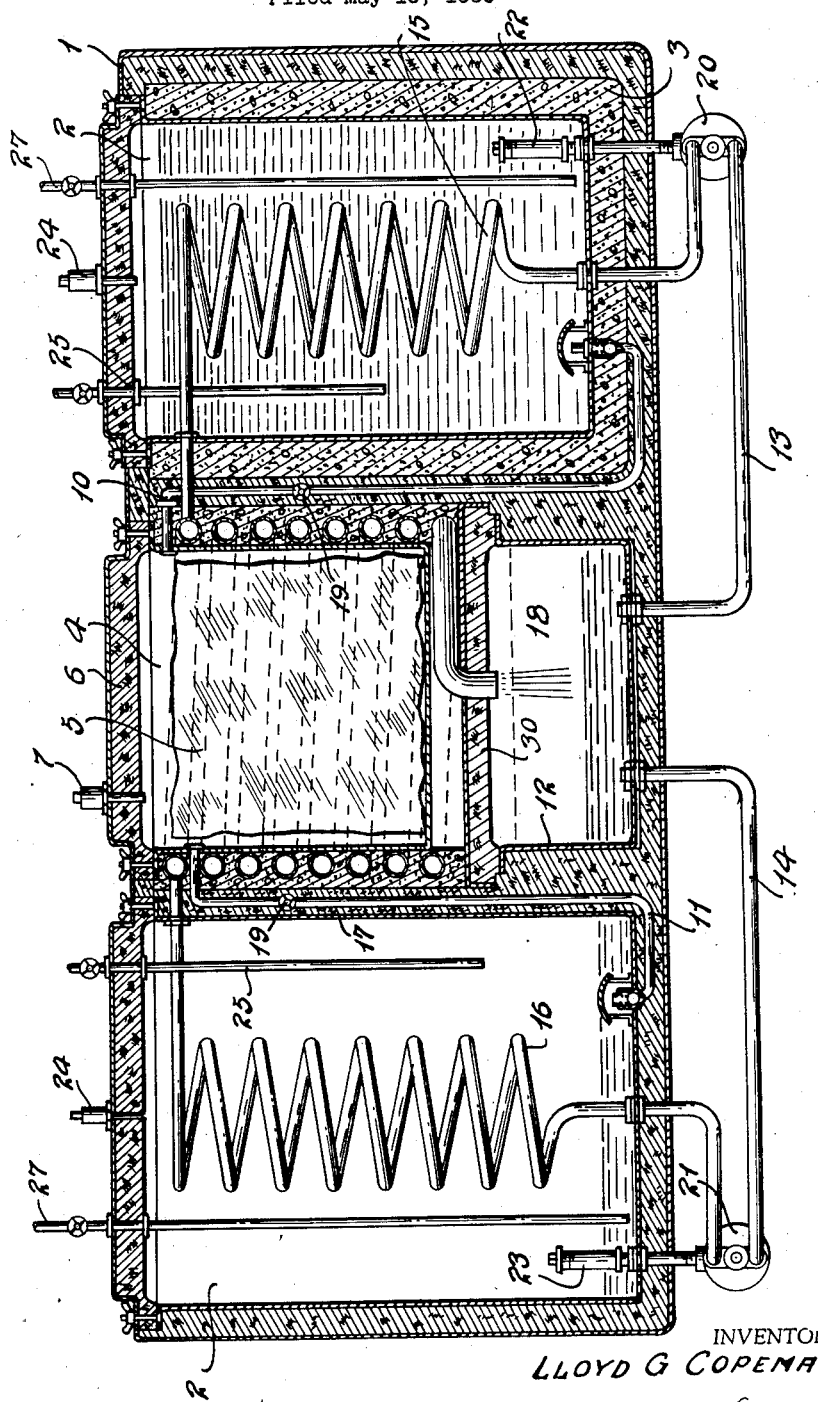
INVENTOR.
LLOYD G COPEMAN.
BY
Barnes, Kisselle & Laughlin
ATTORNEYS.

Patented Aug. 6, 1935

2,010,060

UNITED STATES PATENT OFFICE 2,010,060

METHOD OF AND APPARATUS FOR COOLING BEER

Lloyd G. Copeman, Flint, Mich., assignor to Copeman Laboratories Company, Flint, Mich., a corporation of Michigan Application May 15, 1933, Serial No. 671,168

20 Claims. (Cl. 62—91.5)

This invention relates to the handling of beverages of the type containing carbon dioxide. The invention is particularly useful and is especially directed toward the handling of beer, although the invention is applicable to other charged or carbonated waters or beverages. The invention includes a method or methods which have to do with the manner in which the beer is handled at the brewery and transported therefrom to the point of use, and also to a method of handling the beer after delivery at the point of use and for keeping it in a fresh, vitalized and palatable condition.

The invention also contemplates an apparatus for use in carrying out this latter method at the point of use. In the following description and claims, reference is constantly made to beer, but it is to be appreciated that some features of the method or methods as well as the apparatus may be employed with other carbonated beverages or carbonated waters, and the invention is to be so construed as to covering these other liquids.

The accompanying drawing shows a cross section of an apparatus which is of the type which may be used in carrying out the invention.

It is well known to those versed in this art, that beer has heretofore been put up and transported in kegs and in bottles. Much of the beer put up in bottles is designed for use where it is not feasible to have the beer on draught, while the keg beer, as a rule, is for delivery to places having beer on draught. The present invention is designed to provide means and methods for eliminating the use of kegs as well also as for eliminating at least some of the use of bottles.

Quite a large percentage of the beer heretofore produced was keg beer, that is contained and shipped in kegs, with the result that a large investment in kegs was necessary. Furthermore, kegs have considerable weight in themselves and add greatly to the total weight of a shipment, and after use have to be returned to the brewery thoroughly cleaned and made ready for a refilling. As the beer is brewed and filled into kegs, the kegs are commonly stored and this requires much room and also requires that the temperature in the storage house or compartment be kept at an adequately low temperature. In addition to this, workmen are constantly kept on the job repairing damaged and broken kegs. Large storage space is required also for empty kegs.

In accordance with the present invention, instead of placing the beer in kegs which is usually done with a quantity of carbon dioxide gas, the finished beer may be stored in suitable tanks and kept under suitable conditions, or in some instances, may be handled for direct shipment. In any event, the beer may be placed directly into tanks for transportation; such a tank may be a tank mounted on an automotive vehicle, or suitable containers, tanks or cans adapted to be transported either on an automotive vehicle or a railroad car, or for that matter, a tank car for operating on a railroad. This beer may be in an unvitalized condition, or in other words, it may have little or no carbon dioxide content, or it may have some carbon dioxide content depending upon conditions. In any event, it need not be sealed under pressure to maintain its charged or carbonated condition. The beer in this condition may be transported to a point of use, or to another remote storage place for that matter, where suitable storing and beer vitalizing apparatus may be filled with the beer. This apparatus is preferably designed to utilize solid $CO_2$ as a refrigerating medium, and it is also preferably arranged to charge the beer with the carbon dioxide gases evaporating from the solid carbon dioxide, and maintaining the beer cool and constantly properly charged or vitalized. In addition to this, pressure of the $CO_2$ gas may be, and preferably is, used for discharging the beer for consumption. This apparatus will be better understood, as will also the method, when reference is made to the accompanying drawing.

The apparatus may take the form of a cabinet 1 preferably having two or more beer containing compartments 2 insulated as desired. Ordinary insulation may be used or insulation plus a cast stone lining, as illustrated at 3, may be used. The two compartments in the drawing show this difference. One or more of the compartments may be used for bottled beer or other beverages or food stuffs to be kept refrigerated. The cabinet also has a compartment 4 adapted to receive a block of solid $CO_2$ 5. This compartment preferably has a cover 6 which can be sealed into place and the compartment is also preferably provided with an emergency relief valve 7. A suitable pipe or conduit 10 connects into the compartment 4 and into one of the beer containers 2 preferably near the bottom; another conduit or pipe 11 connects the compartment 4 with the other beer container. A valve 19 may be in the conduits 10 and 11.

A suitable refrigerant or brine of relatively low freezing point is preferably provided, a quantity of which may be maintained in a tank 12 connecting into which are conduits 13 and 14 extending to cooling coils 15 and 16, located in heat exchange relation with the beer containers. As shown herein the coils are located directly in the containers, although they may be otherwise disposed, as for example, around the walls of the containers. The coils connect into another brine container in heat exchange relation with the solid $CO_2$, as for example, the coil 17, and the coil 17 may discharge through pipe 18 into the tank 12. The brine may be circulated through each cooling coil preferably by positive action, as for example, by suitable pumps 20 and 21. These pumps may be of any suitable mechanical type or may be of the gas type utilizing $CO_2$ gases in accordance with my Patent No. 1,840,702 of January 12, 1932. The pumps may be controlled by suitable thermostats 22 and 23.

Each beer container is preferably provided with a relief valve 24 preferably adjustable and with a beer inlet or filling conduit 25 and a discharging or dispensing conduit 27. By providing the beer tanks in multiples, the beer in one compartment may be cooled and vitalized while the beer in the other is being used, but it is obvious that an apparatus with only one beer compartment may be employed within the scope of the invention.

The tanks or containers 2 may be filled with the beer from the shipping tank and the cooling action immediately begins. The thermostat 22 or 23 acts to set the pump into operation with the result that the brine is circulated through the cooling coils. It has been found that by cooling the beer in this fashion with solid $CO_2$ that there is a very rapid cooling action so that in a very short time the beer is cooled to a temperature suitable for consumption. When the proper temperature is attained, preferably around 40° F., the pump or pumps cease operation and there is no longer any brine circulation. Preferably, the quantity of brine used, in relation to the size of the tank 12, is such that the tank 12 is not over full when the coils and conduits are empty, yet, providing that some brine be in the tank 12 when the coils and conduits are full.

The gas from the evaporating $CO_2$ passes through the conduits 10 and 11 and discharges into the bottom of the beer tanks. Thus, carbon dioxide gas is fed into the beer below the surface of the beer and the gas percolates up through the beer thoroughly charging and vitalizing the same and maintaining the same vitalized and in a palatable condition at all times. The valves 24 are preferably set to maintain a suitable pressure on the beer, usually about 20 pounds, with the result that the beer may be forced through the pipes 27 to a point above the cabinet for consumption. Also, this maintains the beer under pressure, thus aiding in maintaining a suitable charged condition. The carbon dioxide gas escapes through the valves 24 and in the event of any clogging of the valves or the lines 10 and 11 the emergency valve 7 may release the gas. Even when one tank is empty it is maintained cool and in a condition for receiving a new charge of beer. The valves 24 may be set to provide a given pressure on the beer and in this manner a proper charged condition may be maintained resulting in a desirable "head" or foam condition in the dispensed beer. Also the valves 19 may be used as pressure reducing valves for aiding the maintaining of different pressures in the containers.

After a new charge of beer has been cooled and the circulation of brine stopped the cool beer may be substantially maintained in its cooled condition by the carbon dioxide gas passing therethrough, thus the gas keeps the beer carbonated or vitalized at all times, keeps it cool and provides the pressure under which the beer is stored, and which may be utilized for lifting the beer to a dispensing faucet. This keeps the beer cool if not drawn off too rapidly, even if there is a failure of the thermostat or pump.

It is appreciated that liquid carbon dioxide has been used to provide the pressure required to lift beer for draught purposes. However, the tank of liquid carbon dioxide was connected to the top of the keg and the carbon dioxide gas merely contacted with the surface of the beer and did not percolate through the same for vitalizing it and adding carbon dioxide. In this connection, it may be pointed out that cool beer has a greater capacity for absorbing carbon dioxide than warm beer and the beer which is poured into a tank and rapidly cooled is rapidly supplied with carbon dioxide so that even if the beer is flat initially, only a very short time is required to get the beer into a properly charged and palatable condition.

The container for the solid $CO_2$ is preferably insulated from the tank 12 as by means of insulation 30 in order to prevent the brine collected in the tank from becoming too cold. The arrangement is preferably such that brine passing through the coil 17 flows therethrough in heat exchange relation with the solid $CO_2$ but does not remain in the coil when the pump or pumps cease operation. Accordingly, coil 17 may be of relatively large cross-sectional area. The pumps lift the brine upwardly through the coils 15 and 16 and then the refrigerant may more or less flow by gravity through the coil 17 discharging into the tank 12, so that when the pump or pumps cease operation the coil 17 drains. This prevents the refrigerant from becoming too cold.

I claim:—

1. The method which comprises, placing beer in a substantially closed container adapted to hold a given pressure, circulating a refrigerant in heat exchange relation with the beer and in heat exchange relation with evaporating solid carbon dioxide to cool the beer, terminating the circulation and cooling of the refrigerant when the beer is cooled to prevent extreme cooling of the refrigerant, and passing carbon dioxide gas into the beer in the container whereby the gas maintains the beer charged, maintains the beer substantially cooled, and maintains the pressure in the tank.

2. The method which comprises placing beer in a substantially closed container adapted to hold a given pressure, circulating a refrigerant in heat exchange relation with the beer and in heat exchange relation with evaporating solid carbon dioxide to cool the beer, terminating the circulation and cooling of the refrigerant when the beer is properly cooled to prevent extreme cooling of the refrigerant, and passing carbon dioxide gas into the beer in the container whereby the gas maintains the beer charged, maintains the beer substantially cooled, and maintains the pressure in the tank adequate for forcing the beer from the container for dispensing purposes.

3. An apparatus substantially for the purpose described, comprising a container for solid $CO_2$ a closed container for beer adapted to hold pressure, means for transferring heat from the beer to the solid $CO_2$ whereby the beer is cooled and the CO₂ evaporates, and means for conducting CO₂ gas from the CO₂ container and discharging the same into the beer container below the surface of the beer, said container being positioned out of heat conducting relation with said heat transferring means during off cycles.

4. An apparatus substantially for the purpose described comprising, a container for solid CO₂, a refrigerant reservoir spaced from said container, a closed container for beer adapted to hold pressure, means connected with said reservoir for cooling the beer in the container, and means for conducting CO₂ gas from the CO₂ container to the beer container and discharging the CO₂ gas into the beer below the surface thereof.

5. An apparatus substantially for the purpose described comprising, a substantially sealed container for solid CO₂, a refrigerant reservoir spaced from said container, a substantially sealed container for beer, means connected with said reservoir for cooling the beer, means for conducting gaseous CO₂ from the first mentioned container to the second mentioned container and discharging the same into the beer below the surface thereof, and a relief valve for the beer container adapted to maintain a given pressure therein.

6. An apparatus substantially for the purpose described comprising, a substantially sealed container for solid CO₂, a refrigerant reservoir spaced from said container, a substantially sealed container for beer, means connected with said reservoir for cooling the beer, means for conducting gaseous CO₂ from the first mentioned container to the second mentioned container and discharging the same into the beer below the surface thereof, a relief valve for the beer container adapted to maintain a given pressure therein, and a valve in the conducting means between the CO₂ container and the beer container.

7. An apparatus substantially for the purpose described comprising, a substantially sealed container for solid CO₂, a refrigerant reservoir positioned out of direct heat conducting relation with said container, a substantially sealed container for beer, means connected with said reservoir for cooling the beer, means for conducting gaseous CO₂ from the first mentioned container to the second mentioned container and discharging the same into the beer below the surface thereof, a relief valve for the beer container adapted to maintain a given pressure therein, and a beer discharge conduit connecting into the beer container through which beer may be forced by reason of the pressure in the container.

8. An apparatus substantially for the purpose described, comprising a substantially closed container for solid carbon dioxide, a refrigerant reservoir positioned out of direct heat conducting relation with said container, a plurality of compartments adapted to contain beer, said compartments being substantially sealed and having relief valves, refrigerant coils connected with said reservoir for conducting a refrigerant in heat exchange relation with the beer and the solid carbon dioxide, and conduits connecting into the solid carbon dioxide chamber and connecting into the beer containers near the bottom thereof to conduct and discharge carbon dioxide gas into the beer.

9. An apparatus substantially for the purpose described, comprising a substantially closed container for solid carbon dioxide, a plurality of compartments adapted to contain beer, said compartments being substantially sealed and having relief valves, refrigerant coils for conducting a refrigerant in heat exchange relation with the beer and the solid carbon dioxide, and conduits connecting into the solid carbon dioxide chamber and connecting into the beer containers near the bottom thereof to conduct and discharge carbon dioxide gas into the beer, and a receiver tank for refrigerant into which the coils connect having a capacity greater than the capacity of the coils.

10. An apparatus substantially for the purpose described, comprising a substantially closed container for solid carbon dioxide, a plurality of compartments adapted to contain beer, said compartments being substantially sealed and having relief valves, refrigerant coils for conducting a refrigerant in heat exchange relation with the beer and the solid carbon dioxide, and conduits connecting into the solid carbon dioxide chamber and connecting into the beer containers near the bottom thereof to conduct and discharge carbon dioxide gas into the beer, a receiver tank for refrigerant into which the coils connect having a capacity greater than the capacity of the coils, and refrigerant in the coils and tank in a quantity sufficient to fill the coils and part of the receiver.

11. A refrigerating device comprising a container for solid carbon dioxide, one or more refrigerating compartments, coils and conduits having portions disposed in heat exchange relation with the solid carbon dioxide and the refrigerating compartments, a receiver tank into which the conduits connect and having a capacity greater than the capacity of the coils and conduits, and refrigerant for circulation through the coils, conduits, and tank, sufficient in amount to fill the coils and conduits and partially fill the receiver tank with the empty portion of the tank having a capacity greater than the coils and conduits.

12. A refrigerating device comprising a container for solid carbon dioxide, one or more refrigerating compartments, coils and conduits having portions disposed in heat exchange relation with the solid carbon dioxide and the refrigerating compartments, a receiver tank into which the conduits connect and having a capacity greater than the capacity of the coils and conduits, and refrigerant for circulation through the coils, conduits, and tank, sufficient in amount to fill the coils and conduits and partially fill the receiver tank with the empty portion of the tank having a capacity greater than the coils and conduits, and means for circulating the refrigerant.

13. A device substantially for the purpose described comprising, a closed container for solid CO₂, a refrigerant reservoir positioned out of direct heat conducting relation with said container, a beer container, coils in heat exchange relation with the CO₂ compartment and the beer compartment, means connected with said reservoir for circulating refrigerant through the coils, thermostatic means for controlling the circulating means, and a conduit connecting the solid CO₂ compartment with the beer compartment and arranged to discharge gaseous CO₂ into the lower portion of the beer compartment.

14. A device substantially for the purpose described comprising, a closed container for solid CO₂, a refrigerant reservoir positioned out of direct heat conducting relation with said container, a beer container, coils in heat exchange relation with the CO₂ compartment and the beer compartment, means connected with said reservoir for circulating refrigerant through the coils, thermostatic means for controlling the circulating means, and a conduit connecting the solid $CO_2$ compartment with the beer compartment and arranged to discharge gaseous $CO_2$ into the lower portion of the beer compartment, said beer compartment being closed whereby the gaseous $CO_2$ maintains the same under pressure, and a discharge conduit through which the beer may be forced by said pressure.

15. A device substantially for the purpose described comprising, a closed container for solid $CO_2$, a refrigerant reservoir positioned out of direct heat conducting relation with said container, a beer container, coils in heat exchange relation with the $CO_2$ compartment and the beer compartment, means connected with said reservoir for circulating refrigerant through the coils, thermostatic means for controlling the circulating means, and a conduit connecting the solid $CO_2$ compartment with the beer compartment and arranged to discharge gaseous $CO_2$ into the lower portion of the beer compartment, said beer compartment being closed whereby the gaseous $CO_2$ maintains the same under pressure, a discharge conduit through which the beer may be forced by said pressure, and a relief valve for the beer compartment.

16. A device substantially for the purpose described comprising, a closed container for solid $CO_2$, a refrigerant reservoir positioned out of direct heat conducting relation with said container, a beer container, coils in heat exchange relation with the $CO_2$ compartment and the beer compartment, means connected with said reservoir for circulating refrigerant through the coils, thermostatic means for controlling the circulating means, and a conduit connecting the solid $CO_2$ compartment with the beer compartment and arranged to discharge gaseous $CO_2$ into the lower portion of the beer compartment, said beer compartment being closed whereby the gaseous $CO_2$ maintains the same under pressure, a discharge conduit through which the beer may be forced by said pressure, a relief valve for the compartment for the solid $CO_2$ and a relief valve for the beer compartment, said latter valve being arranged to relieve at a lower pressure than the valve in the $CO_2$ compartment.

17. A cooling apparatus comprising a container adapted to retain a body of solid carbon dioxide, a compartment for holding material to be refrigerated, a refrigerant coil in heat exchange relation with the said compartment, a refrigerant receiver tank, a refrigerant coil in heat exchange relation with the solid carbon dioxide container connecting the first mentioned coil and the tank, and means for circulating refrigerant with the refrigerant moving from the tank to the first mentioned coil and then to the second mentioned coil and back to the tank, said second mentioned coil being arranged to drain out upon discontinuance of circulation of the refrigerant.

18. A cooling apparatus comprising a container adapted to retain a body of solid carbon dioxide, a compartment for holding material to be refrigerated, a refrigerant coil in heat exchange relation with the said compartment, a refrigerant receiver tank, a refrigerant coil in heat exchange relation with the solid carbon dioxide container connecting the first mentioned coil and the tank, means for circulating refrigerant with the refrigerant moving from the tank to the first mentioned coil and then to the second mentioned coil and back to the tank, the refrigerant being arranged to enter the second mentioned coil substantially at the top thereof and said second mentioned coil being located above the tank whereby refrigerant in the second mentioned coil may drain into the tank upon discontinuance of circulation of the refrigerant.

19. A cooling apparatus comprising a container adapted to retain a body of solid carbon dioxide, a compartment for holding material to be refrigerated, a refrigerant coil in heat exchange relation with the said compartment, a refrigerant receiver tank, a refrigerant coil in heat exchange relation with the solid carbon dioxide container connecting the first mentioned coil and the tank, means for circulating refrigerant with the refrigerant moving from the tank to the first mentioned coil and then to the second mentioned coil and back to the tank, the refrigerant being arranged to enter the second mentioned coil substantially at the top thereof and said second mentioned coil being located above the tank whereby refrigerant in the second mentioned coil may drain into the tank upon discontinuance of circulation of the refrigerant, and said second mentioned coil having a cross-sectional diameter larger than the first mentioned coil.

20. A method which comprises, circulating a liquid refrigerant through passageways in heat exchange relation with solid carbon dioxide and in heat exchange relation with material to be refrigerated, discontinuing the circulation of the refrigerant when a given refrigerating action is obtained, and draining the refrigerant from the passageway which is in heat exchange relation with the solid carbon dioxide upon the discontinuance of the circulation.

LLOYD G. COPEMAN.